(12) United States Patent
Miyazaya et al.

(10) Patent No.: US 9,898,863 B2
(45) Date of Patent: Feb. 20, 2018

(54) INFORMATION PROCESSING DEVICE, INFORMATION PROCESSING METHOD, AND PROGRAM

(71) Applicant: Sony Corporation, Tokyo (JP)

(72) Inventors: Yusuke Miyazaya, Tokyo (JP); Yasuyuki Koga, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 157 days.

(21) Appl. No.: 14/357,245

(22) PCT Filed: Jan. 24, 2013

(86) PCT No.: PCT/JP2013/000350
§ 371 (c)(1),
(2) Date: May 9, 2014

(87) PCT Pub. No.: WO2013/114831
PCT Pub. Date: Aug. 8, 2013

(65) Prior Publication Data
US 2014/0300636 A1    Oct. 9, 2014

(30) Foreign Application Priority Data

Feb. 3, 2012   (JP) ................................ 2012-021888

(51) Int. Cl.
*H04R 5/02*       (2006.01)
*G06T 19/00*     (2011.01)
(Continued)

(52) U.S. Cl.
CPC ........... *G06T 19/006* (2013.01); *H04R 5/033* (2013.01); *H04S 7/304* (2013.01); *A61H 3/061* (2013.01);
(Continued)

(58) Field of Classification Search
CPC ... G02B 27/0172; G02B 27/306; G06F 3/011; G06F 3/012; G06F 3/165; G06F 3/167;
(Continued)

(56) References Cited

U.S. PATENT DOCUMENTS 5,987,142 A    11/1999  Courneau et al.
6,771,294 B1 *  8/2004  Pulli ...................... G06F 3/011
                                                            345/173
(Continued)

FOREIGN PATENT DOCUMENTS

EP         0378339 A2    1/1990
EP         1962547 A1   11/2006
(Continued)

OTHER PUBLICATIONS

May 10, 2016, Japanese Office Action for related JP Application No. 2012-021888.

*Primary Examiner* — Leshui Zhang
(74) *Attorney, Agent, or Firm* — Paratus Law Group, PLLC

(57) ABSTRACT

Provided is an information processing apparatus including a sound output control unit configured to generate localization information of a sound marker based on a virtual position, and a sound output unit configured to output a sound associated with the sound marker, based on the localization information, wherein the virtual position is determined based on a position of a real object present in a space.

23 Claims, 13 Drawing Sheets

(51) Int. Cl.
*H04R 5/033* (2006.01)
*H04S 7/00* (2006.01)
*A61H 3/06* (2006.01)

(52) U.S. Cl.
CPC ....... *H04S 2400/11* (2013.01); *H04S 2400/15* (2013.01)

(58) Field of Classification Search
CPC . H04S 1/00; H04S 1/002; H04S 1/005; H04S 3/00; H04S 7/303; H04S 7/304; H04S 2420/01; H04S 2420/11; H04S 2400/01; H04S 2400/11; H04S 2400/15; H04R 3/00; H04R 3/005; H04R 3/12; H04R 3/033; H04R 27/00; H04R 5/00; H04R 5/02; H04R 2217/03; H04R 2420/01; H04R 2420/07; H04R 2460/07; G11B 19/025; G08B 23/00
USPC ...... 381/1, 310, 309, 17, 18, 19, 26, 58, 91, 381/92, 122, 182, 326, 370, 374, 74, 63, 381/61; 700/94; 345/8, 633, 173; 704/233, 235, 270, 272, 273, 275; 715/716, 727, 848; 463/49, 56; 340/573.1, 407.2, 539.1, 7.58
See application file for complete search history.

(56) References Cited

U.S. PATENT DOCUMENTS

| | | | |
|---|---|---|---|
| 2003/0031334 A1* | 2/2003 | Layton | H04R 27/00 381/310 |
| 2005/0184875 A1* | 8/2005 | Schmandt | G08B 21/0227 340/573.1 |
| 2009/0262946 A1* | 10/2009 | Dunko | H04S 1/002 381/17 |
| 2010/0203933 A1 | 8/2010 | Eyzaguirre et al. | |
| 2011/0304701 A1 | 12/2011 | Ito | |

FOREIGN PATENT DOCUMENTS

| | | | |
|---|---|---|---|
| JP | 2008-092193 | | 4/2008 |
| JP | 2010-527722 | | 8/2010 |
| JP | 2012-022667 | | 2/2012 |
| JP | 2012022667 A | * | 2/2012 |
| WO | WO01/055833 A1 | | 8/2001 |
| WO | WO2011/051009 A1 | | 5/2011 |

\* cited by examiner

[Fig. 1]
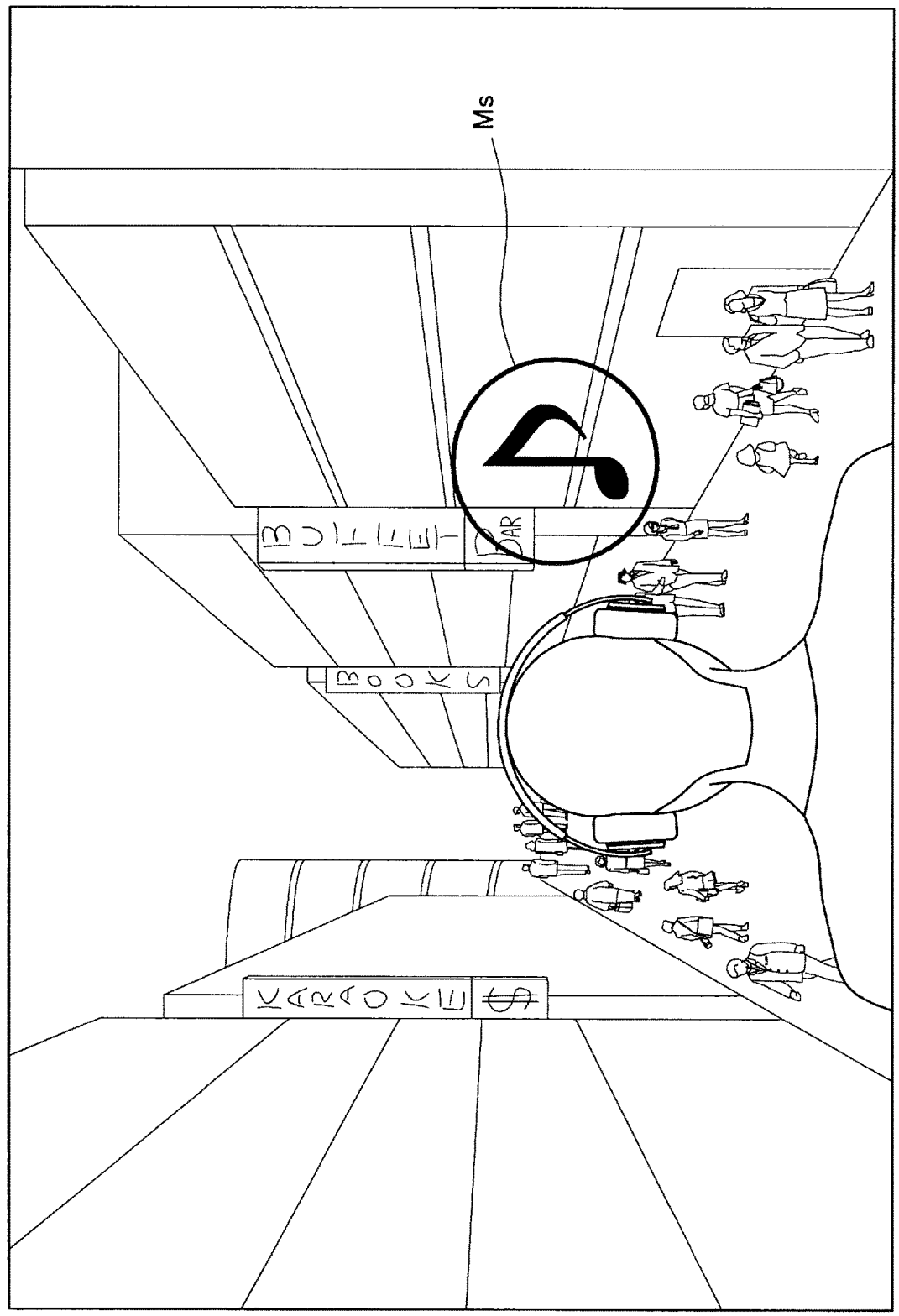

[Fig. 2]
(PRESENTATION OF PRIMARY INFORMATION)
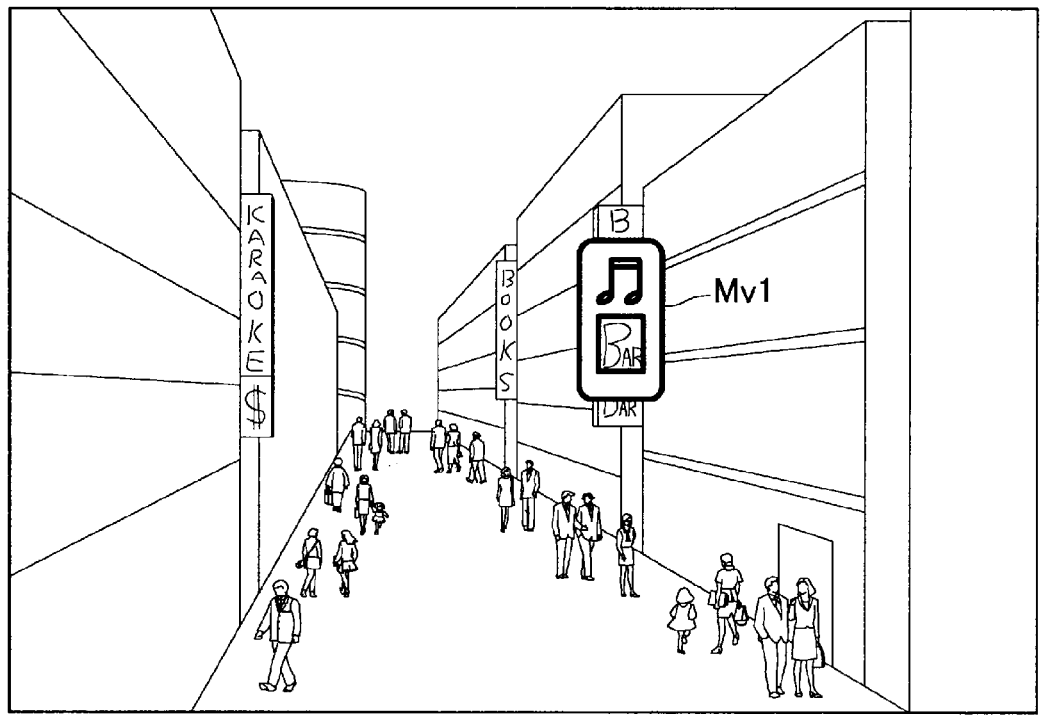
(PRESENTATION OF SECONDARY INFORMATION)
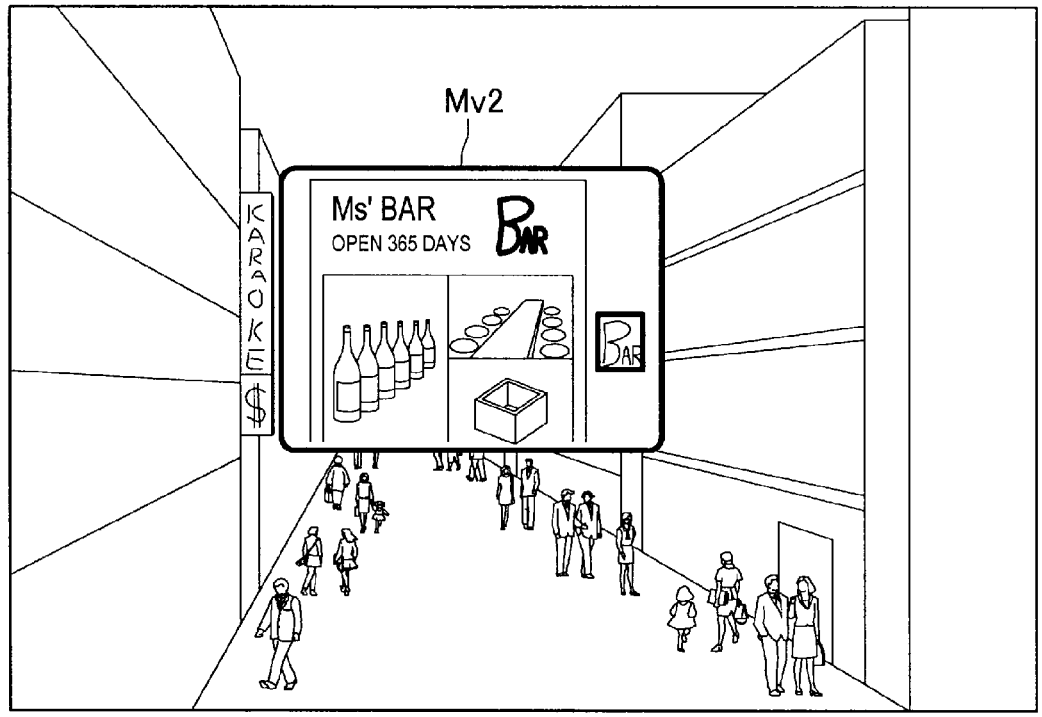

[Fig. 3]
(PRESENTATION OF PRIMARY INFORMATION)
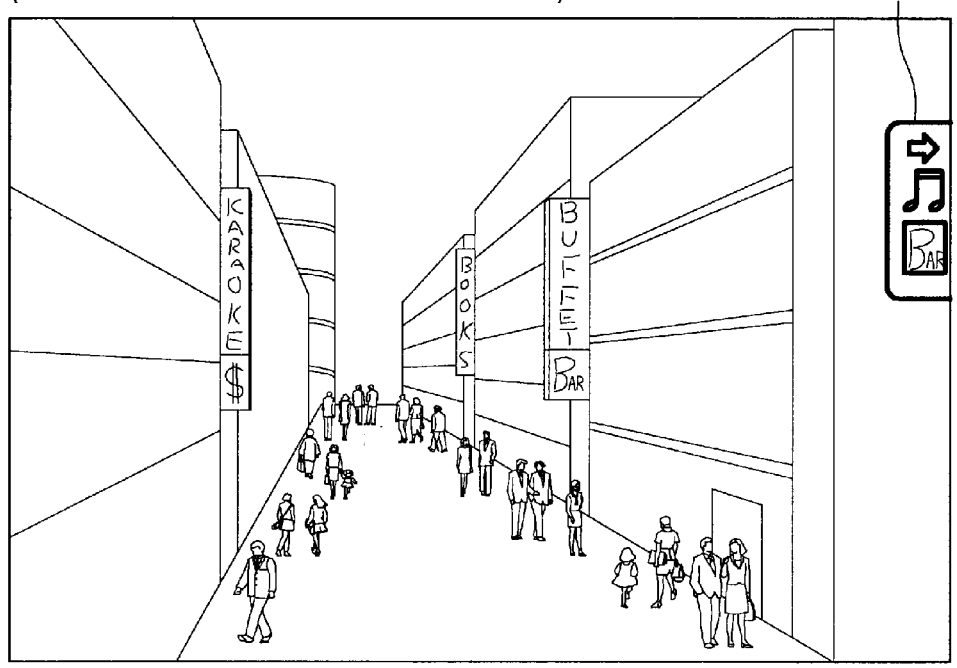
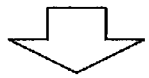
(PRESENTATION OF SECONDARY INFORMATION)
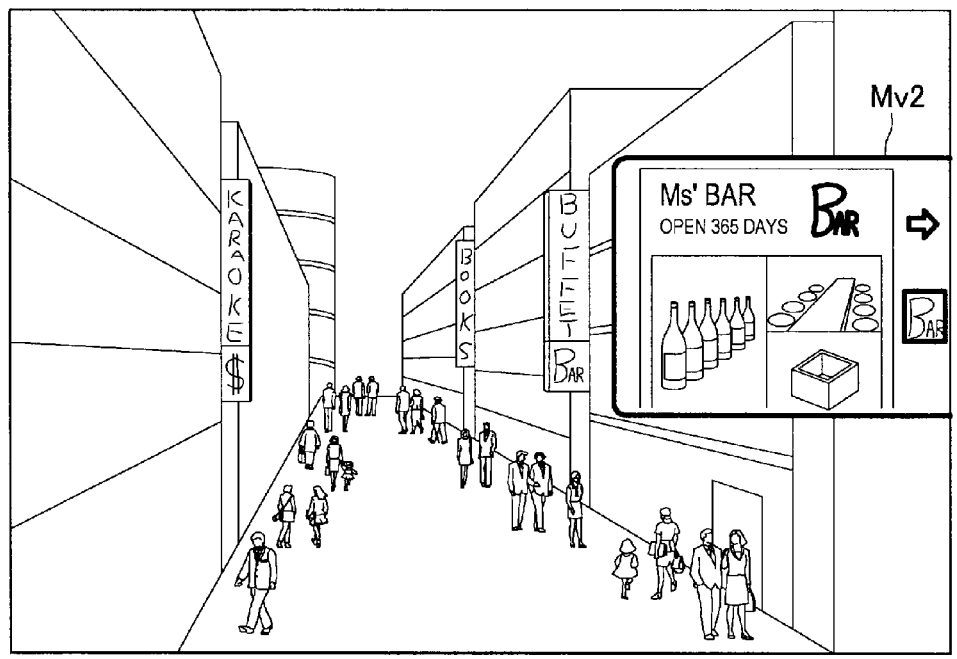

[Fig. 4]
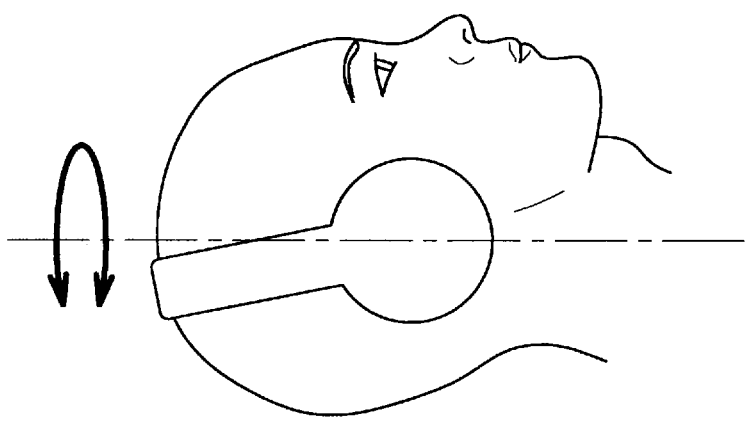
(Dislike/Off)
CANCEL INFORMATION USING HEAD-SHAKING
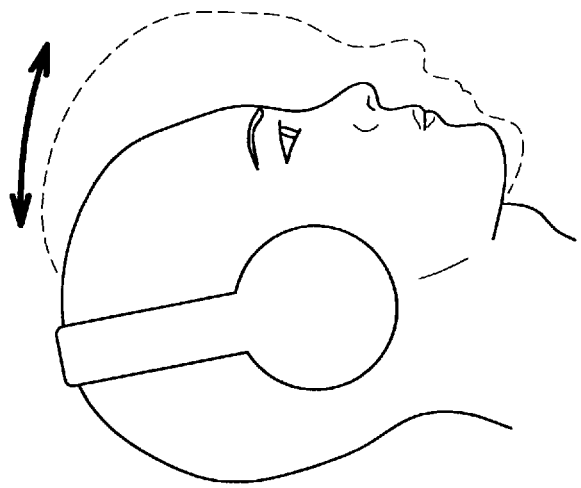
(Like/On)
ACQUIRE INFORMATION USING NODDING

[Fig. 5]
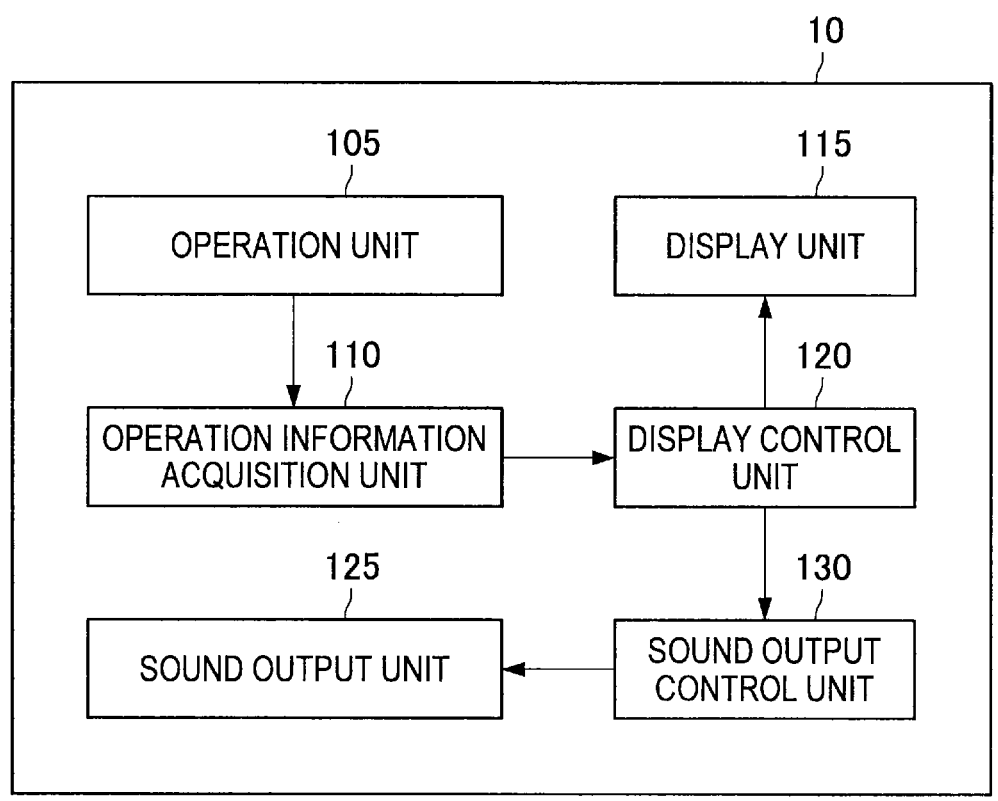

[Fig. 6]
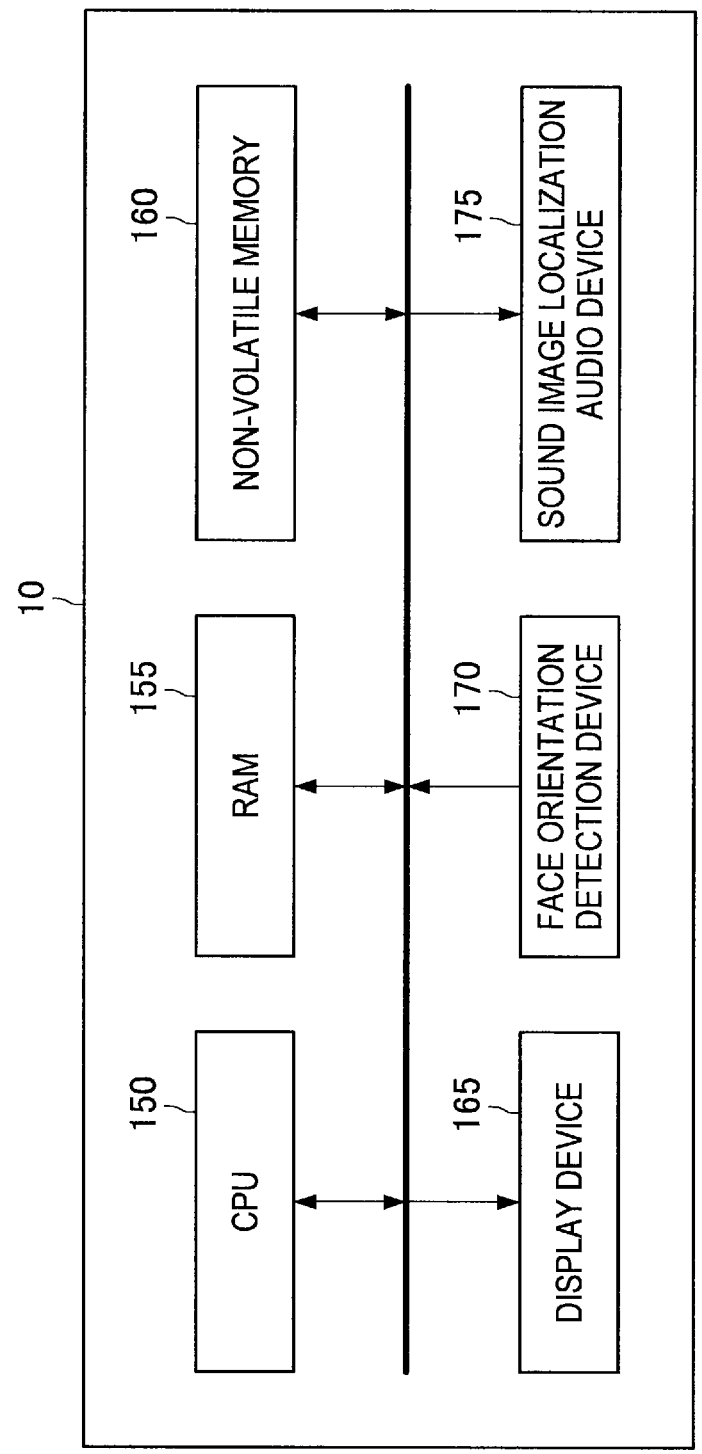

[Fig. 7]
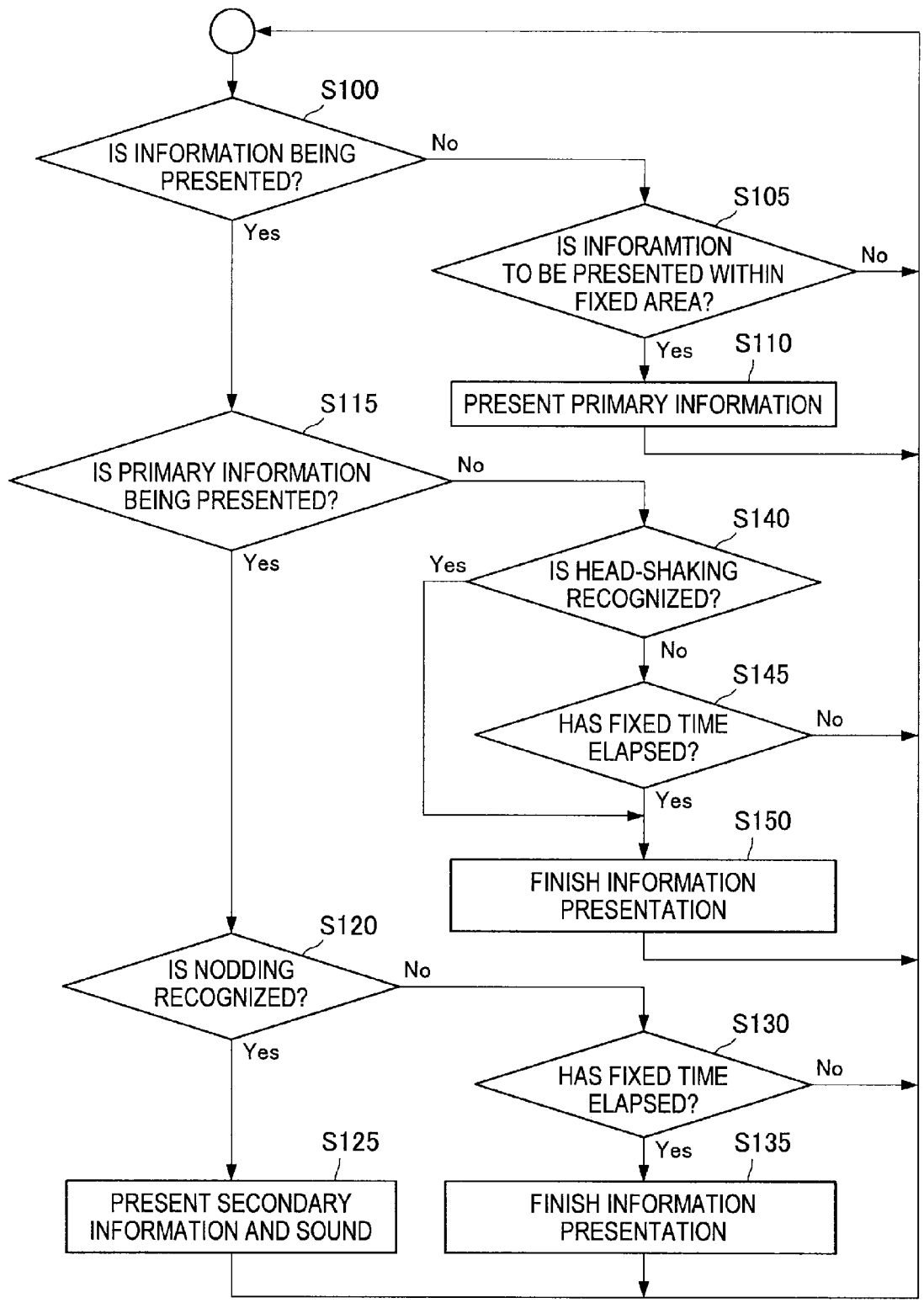

[Fig. 8]
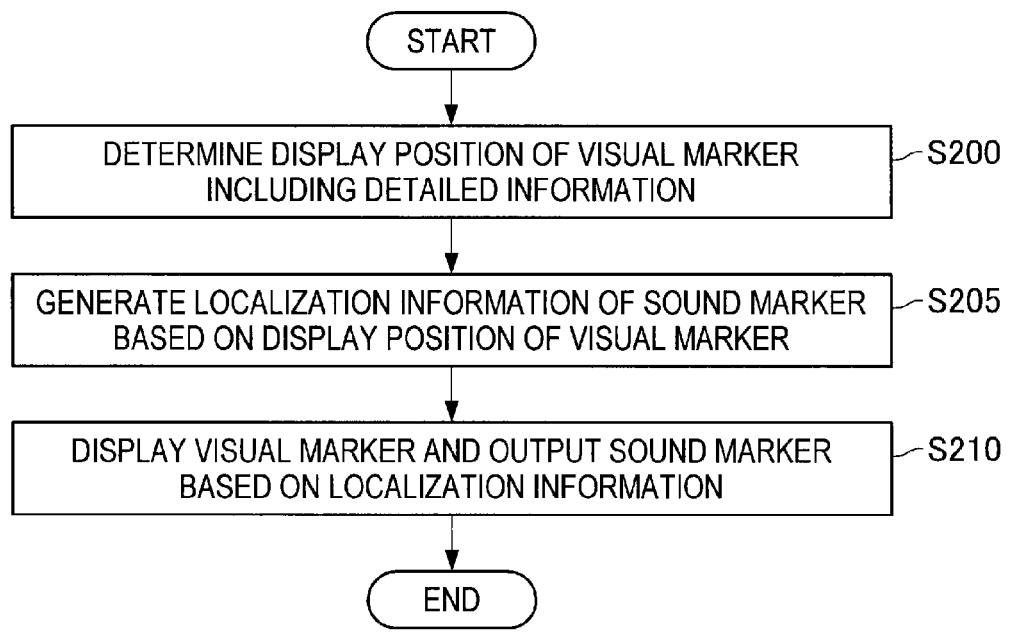

[Fig. 9]
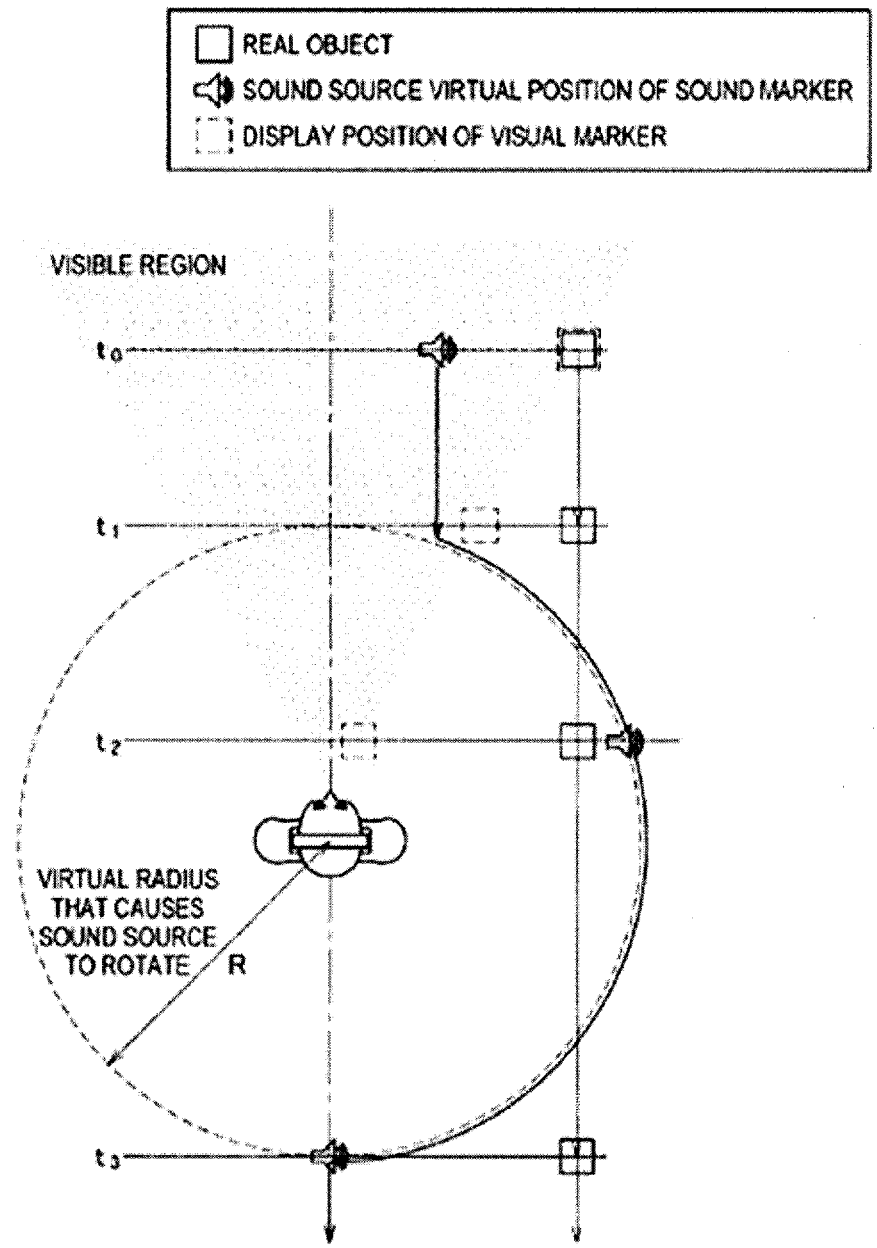

[Fig. 10]
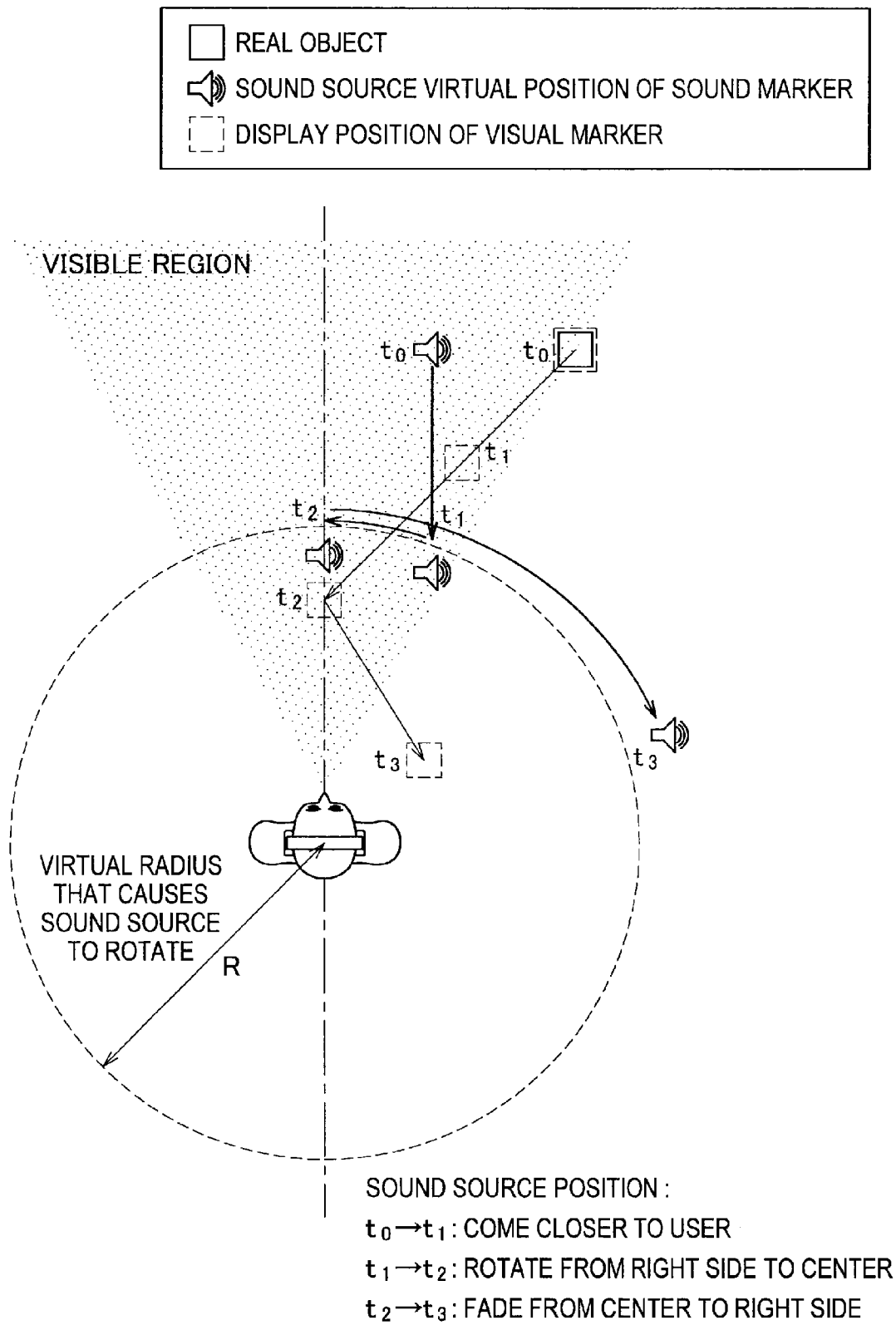

[Fig. 11]
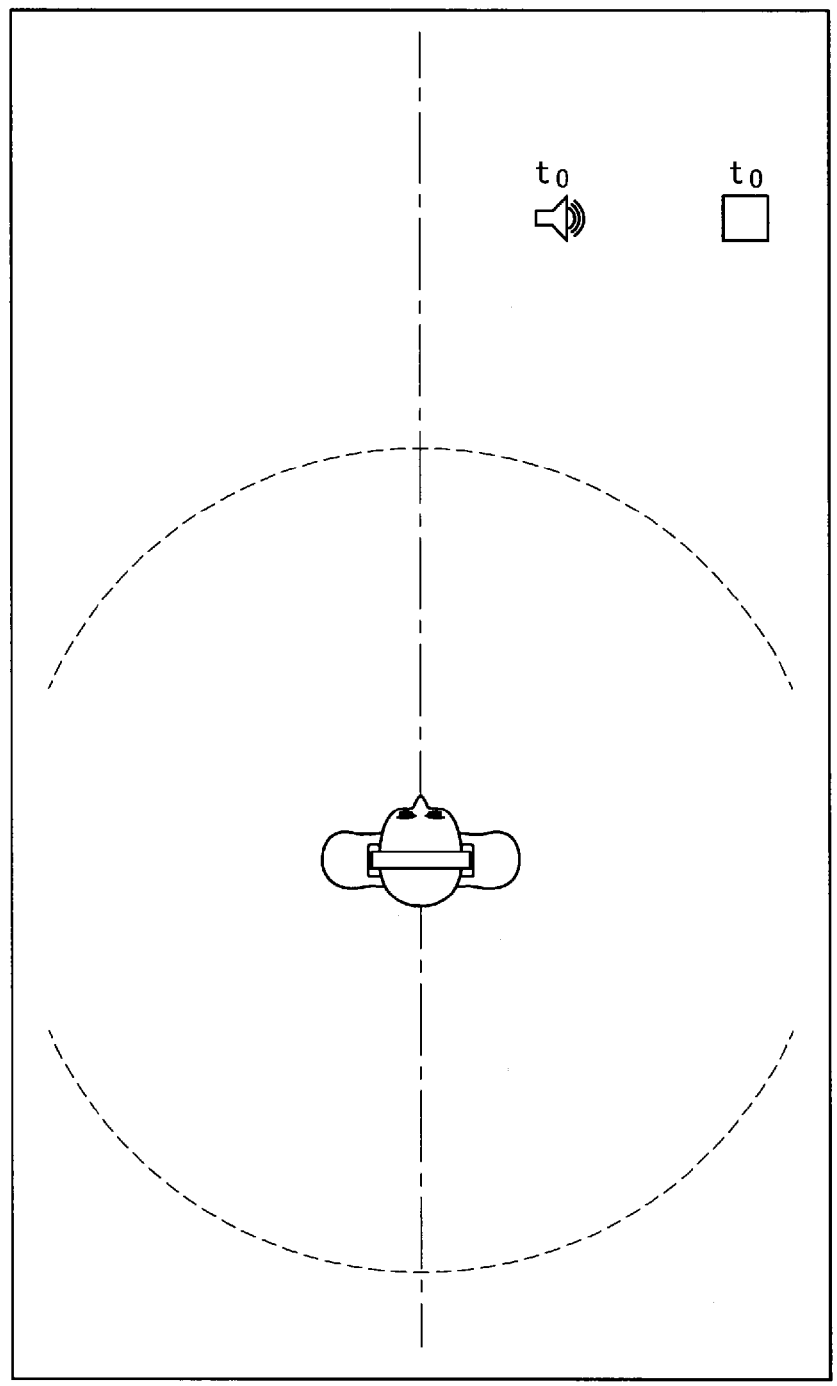

[Fig. 12]
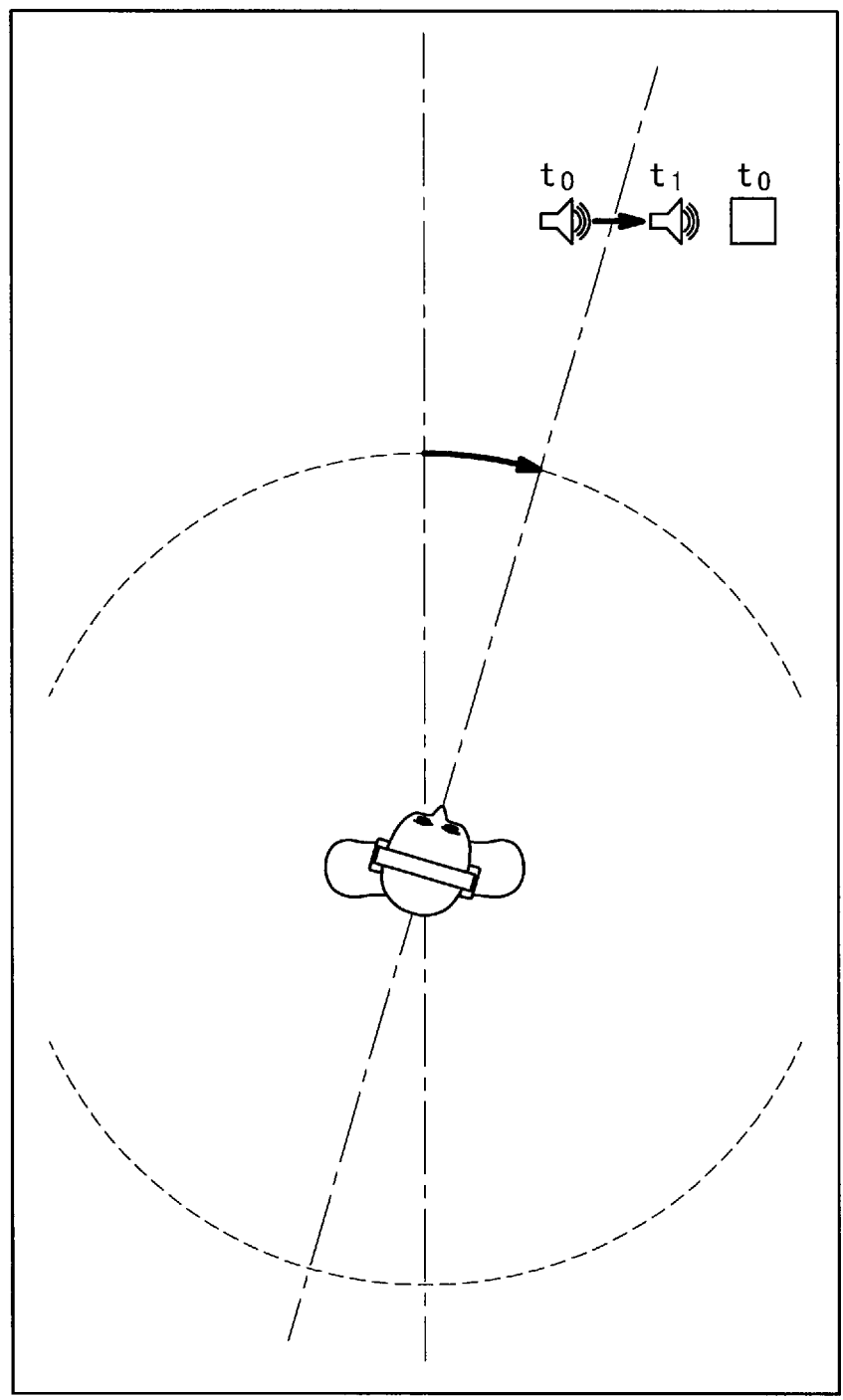

[Fig. 13]
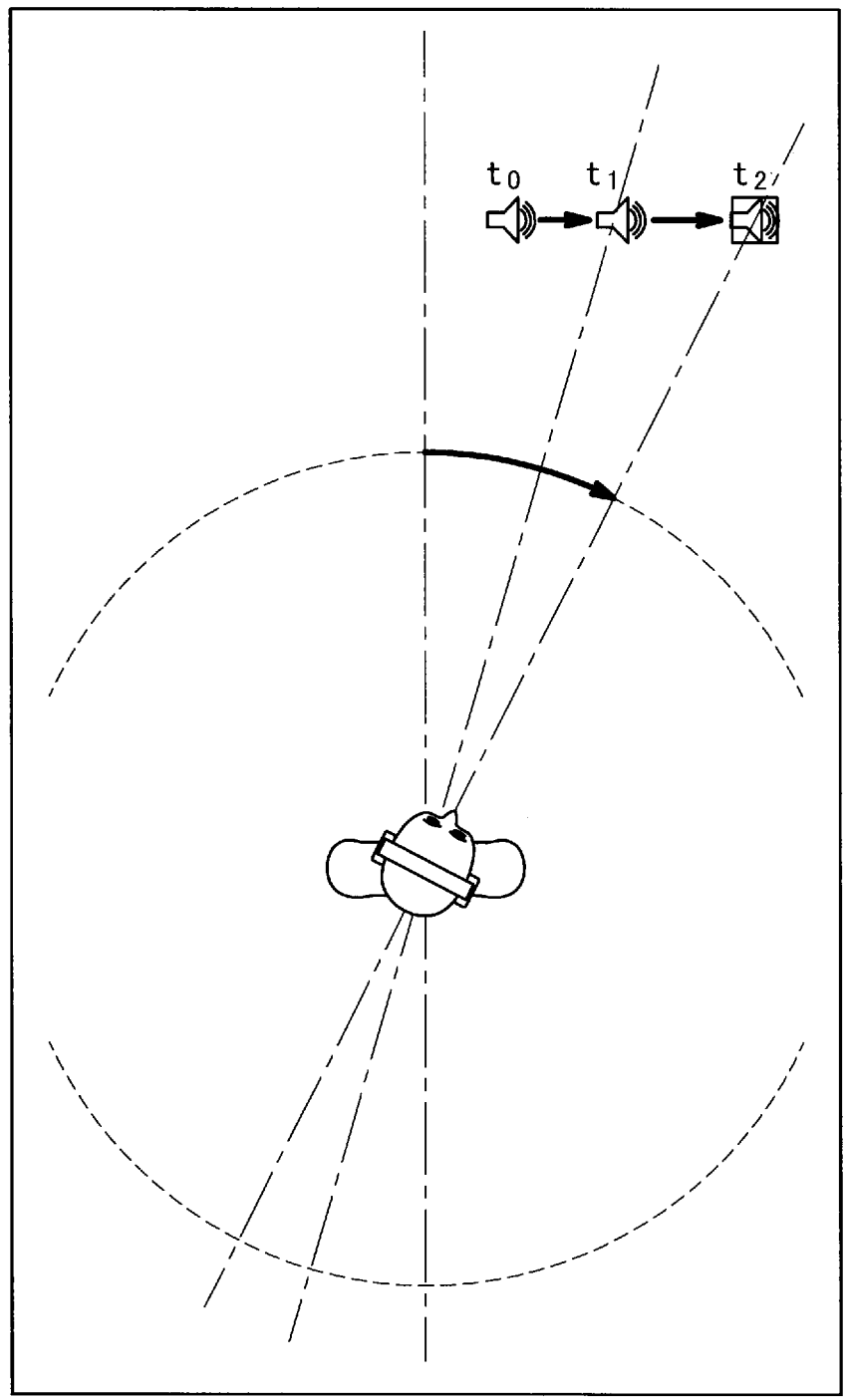

US 9,898,863 B2

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2013/000350 (filed on Jan. 24, 2013) under 35 U.S.C. §371, which claims priority to Japanese Patent Application No. 2012-021888 (filed on Feb. 3, 2012), which are all hereby incorporated by reference in their entirety.

TECHNICAL FIELD

The present disclosure relates to an information processing device, an information processing method, and a program.

BACKGROUND ART

In recent years, the amount of information that users obtain has continued to increase. For at least this reason, questions of how information necessary for users will be extracted, or how information will be provided, have become increasingly important. Thus, presentation of information using sounds has been proposed. PTL 1, for example, discloses an information processing device that provides users with information using sounds having directivity. A user can select a sound using the orientation of his or her face from a plurality of sounds provided by the information processing device.

CITATION LIST

Patent Literature

PTL 1: JP 2008-92193A

Attention has also been directed to a technology called augmented reality (AR) in which additional information is presented to users by being superimposed on a real image. In the AR technology, information presented to users is also called an annotation, which can be visualized as a virtual object in various forms of, for example, text, icons, and animations.

SUMMARY

Technical Problem

Presentation of information using sounds has been seldom discussed in the field of AR technology. Therefore, the present disclosure proposes a novel and improved information processing device, information processing method, and program which are capable of generating localization information of a sound pertaining to a virtual object based on a position of the virtual object.

Solution to Problem

According to an embodiment of the present disclosure, there is provided an information processing apparatus including a sound output control unit configured to generate localization information of a sound marker based on a virtual position, and a sound output unit configured to output a sound associated with the sound marker, based on the localization information, wherein the virtual position is determined based on a position of a real object present in a space.

Further, according to an embodiment of the present disclosure, there is provided an information processing method including generating localization information of a sound marker based on a virtual position, and outputting a sound associated with the sound marker, based on the localization information, wherein the virtual position is determined based on a position of a real object present in a space.

Further, according to an embodiment of the present disclosure, there is provided a non-transitory computer-readable medium embodied with a program, which when executed by a computer, causes the computer to perform a method including generating localization information of a sound marker based on a virtual position, and outputting a sound associated with the sound marker, based on the localization information, wherein the virtual position is determined based on a position of a real object present in a space.

Further, according to an embodiment of the present disclosure, there is provided an information processing device including an acquisition unit that acquires a virtual position of a virtual object determined based on a position of a real object present in a space, and a localization information generation unit that generates localization information indicating a sound source position of sound information associated with the virtual object based on the virtual position.

Further, according to an embodiment of the present disclosure, there is provided an information processing method including acquiring a virtual position of a virtual object determined based on a position of a real object present in a space, and generating localization information indicating a sound source position of sound information associated with the virtual object based on the virtual position.

Further, according to an embodiment of the present disclosure, there is provided a program that causes a computer to function as an information processing device including an acquisition unit that acquires a virtual position of a virtual object determined based on a position of a real object present in a space, and a localization information generation unit that generates localization information indicating a sound source position of sound information associated with the virtual object based on the virtual position.

Advantageous Effects of Invention

According to the present disclosure as described above, it is possible to generate localization information of a sound pertaining to a virtual object based on a position of the virtual object.

BRIEF DESCRIPTION OF DRAWINGS

FIG. 1 is an illustrative diagram showing the overview of user experience provided by an information processing device according to an embodiment of the present disclosure.

FIG. 2 is an illustrative diagram showing an example of a visual marker provided by the information processing device according to an embodiment of the present disclosure.

FIG. 3 is an illustrative diagram showing another example of the visual marker provided by the information processing device according to an embodiment of the present disclosure.

FIG. 4 is an illustrative diagram showing an example of an operation for the information processing device according to an embodiment of the present disclosure.

FIG. 5 is a block diagram showing a function configuration of the information processing device according to an embodiment of the present disclosure.

FIG. 6 is a block diagram showing a hardware configuration example of the information processing device according to an embodiment of the present disclosure.

FIG. 7 is a flowchart for describing an example of an information presentation operation of the information processing device according to an embodiment of the present disclosure.

FIG. 8 is a flowchart for describing an example of a presentation operation of second information and a sound in the information processing device according to an embodiment of the present disclosure.

FIG. 9 is an illustrative diagram showing an example of generating localization information when information is passed over without a user's operation of selecting primary information in the information processing device according to an embodiment of the present disclosure.

FIG. 10 is an illustrative diagram showing an example of generating localization information when the user performs an operation of selecting primary information in the information processing device according to an embodiment of the present disclosure.

FIG. 11 is an illustrative diagram showing an example of generating localization information in a first state when the user changes the orientation of his or her face in the information processing device according to an embodiment of the present disclosure.

FIG. 12 is an illustrative diagram showing an example of generating localization information in a second state when the user changes the orientation of his or her face in the information processing device according to an embodiment of the present disclosure.

FIG. 13 is an illustrative diagram showing an example of generating localization information in a third state when the user changes the orientation of his or her face in the information processing device according to an embodiment of the present disclosure.

DESCRIPTION OF EMBODIMENTS

Hereinafter, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.

1. Overview
2. Configuration Example
2-1. Function Configuration Example
2-2. Hardware Configuration Example
3. Operation Example
4. Generation of Localization Information
<1. Overview>

First, the overview of user experience provided by an information processing device according to an embodiment of the present disclosure will be described with reference to FIGS. 1 to 4. FIG. 1 is an illustrative diagram showing the overview of user experience provided by the information processing device according to an embodiment of the present disclosure. FIG. 2 is an illustrative diagram showing an example of a visual marker provided by the information processing device according to an embodiment of the present disclosure. FIG. 3 is an illustrative diagram showing another example of the visual marker provided by the information processing device according to an embodiment of the present disclosure. FIG. 4 is an illustrative diagram showing an example of an operation for the information processing device according to an embodiment of the present disclosure.

The information processing device 10 according to an embodiment of the present disclosure may provide information associated with a real object present in a real space using visual information and sound information. Hereinafter, visual information will also be referred to as a visual marker Mv or a virtual object. In addition, sound information will also be referred to as a sound marker Ms. The information processing device 10 may determine a position of the visual marker Mv based on, for example, a position of a real object. In addition, the information processing device 10 may determine a sound source position of the sound marker Ms based on the position of the visual marker Mv. The information processing device 10 may display the visual marker Mv, for example, over the position of a real object in an imaged video in a superimposing manner. In addition, the information processing device 10 may determine the sound source position of the sound marker Ms as if the sound marker is heard from the position of the real object in the imaged video (FIG. 1). Note that FIG. 1 is merely an image, and the sound marker Ms may actually be invisible. The sound marker Ms may be provided using a sound. Furthermore, the information processing device 10 may provide a user with information obtained by filtering information associated with real objects located in the vicinity of the user according to the preference, the purpose, or the like of the user.

FIG. 2 illustrates an example of the visual marker Mv. The visual marker Mv may be provided to a user by being displayed in a superimposing manner over a video imaged by, for example, a camera. In addition, the visual marker Mv may be provided using an HMD (Head Mounted Display). Filtered information may be first provided as, for example, primary information Mv1 of the visual marker Mv. The primary information Mv1 may be, for example, information which is associated with the corresponding position having granularity as brief as to inform a user of the overview of the information. When the user does not perform any operation for the primary information Mv1, the information is passed over.

On the other hand, when the user performs a selection operation for the displayed primary information Mv1, further detailed information may be provided to the user. For example, according to the selection operation, secondary information Mv2 that includes more detailed information than the primary information Mv1 may be displayed. In addition, a sound marker Ms may be provided with the display of the secondary information Mv2. Specifically, the sound marker Ms may be provided as a sound having directivity. The sound source position of the sound marker Ms may be decided based on the positional relationship between the position of the visual marker Mv and the position of the user. Accordingly, the user can perceive the position of the visual marker Mv from the direction in which the sound marker Ms is heard.

In addition, an example of providing information outside of the visual field is illustrated in FIG. 3. The information processing device 10 may cause the primary information Mv1 of the visual marker Mv to be displayed on the edge of the display region. When a selection operation for the primary information Mv1 of the information associated with a position outside the visual field is detected, the information processing device 10 may cause the secondary information Mv2 to be displayed on the edge of the display region and may output the sound marker Ms.

A selection operation for acquiring information using the secondary information Mv2 and the sound marker Ms herein may depend on the kind of the information processing device 10. When the information processing device 10 is an HMD, for example, the operation may be performed using the orientation of the user's face. In addition, when the information processing device 10 is a mobile telephone, the operation may be performed using the orientation of the user's face in the same manner, or using a touch sensor, a button, or the like. FIG. 4 illustrates an example of the operation using the orientation of a user's face. When the information processing device 10 detects a nodding movement based on the orientation of the user's face, for example, the movement can be determined to be an operation of acquiring specific information. In addition, when the information processing device 10 detects a shaking movement of the head based on the orientation of the user's face, the movement can be determined to be an operation of cancelling selection of specific information.

Note that an example in which shop information associated with a sign board in a street has been illustrated here, but the present technology is not limited to this example. The present technology may also be used for the purpose of, for example, avoiding risks. There are an increasing number of people who enjoy jogging or cycling while listening to music through headphones. In such a situation, there is a high possibility of causing an accident without being aware of an approaching vehicle since it is difficult to hear ambient sounds. Thus, when a vehicle approaches a user, by displaying a virtual engine sound as the sound marker Ms and an image of the vehicle as the visual marker Mv, it may be possible to minimize or avoid risk even while listening to music. Hereinbelow, for realizing such user experience, an information processing device 10 in accordance with an embodiment of the present disclosure will be described in detail.

<2. Configuration Example>

Herein, a configuration of an information processing device 10 according to an embodiment of the present disclosure will be described. First, a function configuration example of the information processing device 10 will be described with reference to FIG. 5, and a hardware configuration example of the information processing device 10 will be described with reference to FIG. 6. FIG. 5 is a block diagram showing the function configuration of the information processing device according to an embodiment of the present disclosure. FIG. 6 is a block diagram showing the hardware configuration example of the information processing device according to an embodiment of the present disclosure.

2-1. Function Configuration Example

Referring to FIG. 5, the information processing device 10 according to an embodiment of the present disclosure may include, mainly, an operation unit 105, an operation information acquisition unit 110, a display unit 115, a display control unit 120, a sound output unit 125, and a sound output control unit 130.

(Operation Unit 105)

The operation unit 105 may have a function such as generating an input signal for performing an operation that a user desires. The operation unit 105 may include, for example, an input section such as a touch panel, a mouse, a keyboard, a button, a microphone, a switch, a lever, and various sensors that are used to input information by a user, an input control circuit that generates and outputs an input signal based on an input by a user, or the like. For example, the operation unit 105 may generate and output an input signal based on the orientation of a user's face detected by a sensor. In addition, the operation unit 105, for example, may detect an operation performed on a touch sensor by a user and then generate and output an input signal based on the corresponding operation.

(Operation Information Acquisition Unit 110)

The operation information acquisition unit 110 may have a function such as acquiring operation information input by a user. For example, the operation information acquisition unit 110 may acquire an input signal output from the operation unit 105 as operation information. The information processing device 10 may operate based on the operation information acquired by the operation information acquisition unit 110.

(Display Unit 115)

The display unit 115 is an example of an output device, and may be a display device such as a liquid crystal display (LCD) device, or an organic EL (or OLED: Organic Light Emitting Diode) display device. In addition, the display unit 115 may be an HMD. The display unit 115 may operate according to the control of the display control unit 120.

(Display Control Unit 120)

The display control unit 120 may have a function such as controlling the content of a display screen to be provided to a user. For example, the display control unit 120 may cause the visual marker Mv to be displayed on an optical transmission type HMD. Alternatively, the display control unit 120 may cause a video obtained by superimposing the visual marker Mv on a video obtained by imaging the visual field of a user to be displayed on a video transmission type HMD. In addition, the display control unit 120 may control the content of a display screen based on operation information acquired by the operation information acquisition unit 110. For example, when a selection operation for the primary information Mv1 of the visual marker Mv is acquired, the display control unit 120 may cause the secondary information Mv2 corresponding to the primary information to be displayed on the display screen. Note that the display control unit 120 is an example of an acquisition unit that acquires a position of a virtual object (hereinafter referred to as a virtual position) determined based on the position of a real object present in a space, but is not limited thereto.

(Sound Output Unit 125)

The sound output unit 125 may have a function such as outputting a sound signal. The sound output unit 125 may be, for example, a speaker. In addition, the sound output unit 125 may be an output terminal that outputs a sound signal to a sound output device such as headphones. The sound output unit 125 may operate according to the control of the sound output control unit 130. The sound output device used here may be capable of outputting stereophony according to localization information of a sound.

(Sound Output Control Unit 130)

The sound output control unit 130 may have a function such as controlling the output of sounds to a user. In addition, the sound output control unit 130 is an example of a localization information generation unit that generates localization information indicating a sound source position, but is not limited thereto. The sound output control unit 130 may generate localization information indicating a sound source position of sound information associated with the same real object as one relating to a virtual object, for example, one associated with a virtual object based on, for example, a virtual position. The sound output control unit 130 may also generate localization information based on the distance between a user position and a virtual position.

Specifically, when the distance between a user position and a virtual position is equal to or longer than a threshold value that may or may not be predetermined, the sound output control unit 130 may bring the sound source position closer to the front of the user than to the virtual position. In addition, when the distance between the user position and the virtual position is shorter than the threshold value, the sound output control unit 130 may move the sound source position from the front of the user to the direction closer to the virtual position. Humans tend to have a higher ability to recognize the direction of a sound from an area of the front than from an area of a side. For this reason, humans can more easily recognize the direction of a sound at rest, for example, in the front than in the right side. In addition, humans tend to more easily recognize the direction of a sound of which the sound source position moves than the direction of a sound at rest. For this reason, when a virtual position is separated from a user position in a predetermined or longer distance, for example, even when the sound source position is located obliquely forward as viewed from a user, there is a high possibility that the user is not able to recognize such a difference of sound source positions. Thus, when a virtual position is separated from a user position in a predetermined or longer distance, the sound source position may be set to be in the front side of the user, and when the user approaches the virtual position, the sound source position may be moved from the front side of the user to a direction closer to the virtual position, so that the user can recognize the direction of the virtual position more easily.

In addition, the sound output control unit 130 may change the sound source position according to changes in the orientation of user's face. In this case, when the position of the virtual object is located at an area in front of the user that may or may not be predetermined, it may be desirable to set the sound source position to be the virtual position. The sound output control unit 130 may output the sound marker Ms according to generated localization information.

Hereinabove, examples of the functions of the information processing device 10 according to embodiments have been shown. Respective constituent elements described above may be configured using general-purpose members or circuits or may be configured using hardware specialized for the functions of the respective constituent elements. In addition, the functions of the respective constituent elements may be fulfilled by reading a control program from a storage medium such as a ROM (Read Only Memory) or a RAM (Random Access Memory) storing the control program describing procedures in which an arithmetic operation unit such as a CPU (Central Processing Unit) realizes the functions and by interpreting the program. Thus, it is possible to appropriately change a configuration to be used according to the level of the technology at a time when the present embodiment is implemented. Hereinbelow, an example of a hardware configuration of the information processing device 10 will be shown.

A computer program for realizing each of the functions of the information processing device 10 according to embodiments as described above may be created and installed in a personal computer, or the like. In addition, a recording medium that stores such a computer program and which is readable on the computer may also be provided. The recording medium may include, for example, a magnetic disk, an optical disc, a magneto optical disc, a flash memory, and the like. In addition, the computer program may be delivered through, for example, the Internet, without using the recording medium.

2-2. Hardware Configuration Example

Next, a hardware configuration example of the information processing device 10 according to an embodiment of the present disclosure will be described with reference to FIG. 6. The information processing device 10 may include a CPU 150, a RAM 155, a non-volatile memory 160, a display device 165, a face orientation detection device 170, and a sound image localization audio device 175.

(CPU 150)

The CPU 150 may function as, for example, an arithmetic processing unit or a control unit, and may control all or some operations of each constituent element based on various programs recorded on the RAM 155, the non-volatile memory 160, or the like.

(RAM 155)

The RAM 155 may temporarily store a program read in the CPU 150, a parameter that is appropriately changed during the execution of the program, or the like.

(Non-Volatile Memory 160)

The non-volatile memory 160 may be a storage device that retains storage without a power supply. The non-volatile memory 160 may be used as, for example, an auxiliary storage device or a long-term memory storage. The non-volatile memory 160 may be a semiconductor memory, for example, a ROM (Read Only Memory), a flash memory, or the like. In addition, the non-volatile memory 160 may be a magnetic storage device such as an HDD (Hard Disk Drive), an optical disc, or the like.

(Display Device 165)

The display device 165 may be a device, for example, an HMD, or the like, having a display function. Alternatively, the display device 165 may be a display device such as a liquid crystal display (LCD) device, or an organic EL (or OLED: Organic Light Emitting Diode) display device.

(Face Orientation Detection Device 170)

The face orientation detection device 170 may have a function of detecting the orientation of the user's face. The face orientation detection device 170 may be, for example, an HMD having a triaxial acceleration sensor. In this case, the display device 165 and the face orientation detection device 170 may be regarded as the same device.

(Sound Image Localization Audio Device 175)

The sound image localization audio device 175 may be an audio device that can perform sound image localization. The sound image localization audio device 175 may output a sound having directivity based on localization information.

<3. Operation Example>

Next, an operation example of the information processing device 10 according to an embodiment of the present disclosure will be described with reference to FIGS. 7 and 8. FIG. 7 is a flowchart for describing an example of an information presentation operation of the information processing device according to an embodiment of the present disclosure. FIG. 8 is a flowchart for describing an example of a presentation operation of second information and a sound in the information processing device according to an embodiment of the present disclosure.

First, referring to FIG. 7, the display control unit 120 may determine whether information is being presented or not (S100). Then, when it is determined that the information is not being presented in Step S100, the display control unit 120 may determine whether the information to be presented is within a fixed area or not (S105). When it is determined that the information to be presented is within the fixed area in the determination of Step S105, the display control unit 120 may present the primary information Mv1 of the visual marker Mv (S110).

On the other hand, when it is determined that the information is being presented in step S100, the display control unit 120 may determine whether the primary information Mv1 is being presented or not (S115). Then, when it is determined that the primary information is not being presented in Step S115 (in other words, the secondary information is being presented), a determination may be made as to whether the operation information acquisition unit 110 recognizes head shaking or not (S140). Then, when head shaking has not been recognized in the determination of Step S140, a determination may be made as to whether a fixed time has elapsed (from when the secondary information starts to be presented) or not (Step S145). Then, when a fixed time has elapsed or when head shaking has been recognized, the display control unit 120 and the sound output control unit 130 may finish the presentation of information (S150).

On the other hand, when it is determined that the primary information is being presented in the determination of Step S115, it may then be determined whether nodding has been recognized by the operation information acquisition unit 110 or not (S120). Then, when it is determined that nodding has been recognized in the determination of Step S120, the display control unit 120 and the sound output control unit 130 may present the user with the secondary information and sound information (S125). On the other hand, when nodding has not been recognized in the determination of Step S120, a determination may be made as to whether a fixed time has elapsed (from when the primary information starts to be presented) or not (S130). Then, when it is determined that a fixed time has elapsed in the determination of Step S130, the display control unit 120 may finish the presentation of the primary information (S135).

Now, the presentation operation of the secondary information and the sound information shown in Step S125 will be described in detail with reference to FIG. 8.

Referring to FIG. 8, first, the display control unit 120 may determine a display position of the secondary information Mv2 of the visual marker Mv (S200). Herein, the secondary information Mv2 may include more detailed information than the primary information Mv1.

Next, based on the display position of the visual marker Mv, localization information of the sound marker Ms may be generated (S205). The generation of the localization information will be described in more detail later. Further, the sound source position of the sound marker Ms may be determined based on the position of the visual marker Mv.

Then, the display control unit 120 may display the visual marker Mv, and the sound output control unit 130 may cause the sound marker Ms to be output based on the localization information (S210).

<4. Generation of Localization Information>

Next, the generation of the localization information of a sound marker will be described in detail with reference to FIGS. 9 to 13. FIG. 9 is an illustrative diagram showing an example of generating the localization information when information is passed over without a user's operation of selecting the primary information in an information processing device according to an embodiment of the present disclosure. FIG. 10 is an illustrative diagram showing an example of generating the localization information when the user performs an operation of selecting the primary information in an information processing device according to an embodiment of the present disclosure. FIG. 11 is an illustrative diagram showing an example of generating the localization information in a first state when the user changes the orientation of his or her face in an information processing device according to an embodiment of the present disclosure. FIG. 12 is an illustrative diagram showing an example of generating the localization information in a second state when the user changes the orientation of his or her face in an information processing device according to an embodiment of the present disclosure. FIG. 13 is an illustrative diagram showing an example of generating the localization information in a third state when the user changes the orientation of his or her face in an information processing device according to an embodiment of the present disclosure.

As described above, the sound source position of the sound marker Ms may be determined based on a position of the visual marker Mv. In order for a sound to be heard from the direction of the visual marker Mv, the position of the visual marker Mv may simply be set at the sound source position of the sound marker Ms. Note that the auditory sense of humans has various characteristics. Therefore, it may be desirable to determine the sound source position so that humans easily recognize the direction and distance of a sound in accordance with the characteristic of the auditory sense of humans. Hereinbelow, the sound source position of the sound marker Ms will be discussed along with several given examples.

First, referring to the example of FIG. 9, a case in which a real object passes by a side of a user from an oblique front side is considered. In this case, since the real object is present within the visible region of the user at a time t0, the visual marker Mv may be displayed at the position of the real object. After that, at a time t1, the real object is positioned out of the visible region of the user. Thus, at this moment, the visual marker Mv may be displayed on an edge of the visible region (edge of the display screen). Then, the visual marker Mv may be displayed on an edge of the visible region until the real object is positioned at substantially right beside the user.

In this case, the sound source position of the sound marker Ms may be located closer to the front side of the user than to the position of the visual marker Mv until the distance between the visual marker Mv and the user becomes a threshold value that may or may not be predetermined (herein, a virtual radius R having the user as the center). In addition, if the distance between the visual marker Mv and the user is shorter than the threshold value, the sound source position of the sound marker Ms may draw a trace moving on the circumference of the virtual radius R having the user position as the center. For example, the sound source position of the sound marker Ms may rotate on the circumference until the position is located right behind the user and then recede.

As described above, humans have high resolution capability for a sound in a region close to the front side. On the other hand, humans have low resolution capability for a sound in a lateral side. For this reason, it is easier to feel a sense of distance to the sound source position when the sound source position gets closer to the user straightly within a region close to the front side than when the sound source position gets closer to the user obliquely in accordance with the positions of the visual marker Mv in the example of FIG. 9. In addition, the feeling of a sound passing by is more easily recognized by rotating the position of the sound along the circumference of the virtual radius R.

Next, referring to FIG. 10, a case in which the user performs a selection operation for the primary information is illustrated. In this case, since the real object is present within the visible region of the user at the time t0, the visual marker Mv may be displayed at the position of the real object. At this moment, if the user performs a selection operation for the visual marker Mv, the visual marker Mv may move so as to be displayed in the front side of the user at the times t1 and t2. After that, at a time t3, the visual marker Mv may disappear to the outside of the visible region.

In this case, the sound source position of the sound marker Ms may be on the front side of the user rather than at the position of the visual marker Mv at the time t0. Then, the sound source position of the sound marker Ms may get closer to the user straightly until the distance between the user and the visual marker Mv becomes a radius R that may or may not be predetermined. After that, as the visual marker Mv is displayed on the front side of the user, the sound source position of the sound marker Ms may move to the front side of the user one time. After that, as the visual marker Mv disappears to the outside of the visible region, the sound source position of the sound marker Ms may recede while rotating on the circumference of the radius R having the user as the center.

Next, referring to FIGS. 11 to 13, the sound source position of the sound marker Ms when the orientation of the user's face changes will be discussed. It is assumed that, for example, a real object (t0) is positioned in the front oblique to the right side. Then, as shown in FIG. 11, the sound source position of the sound marker Ms may be located on the front side of the user rather than on the side of the real object. It is assumed that the orientation of the user's face is changed to the right side in this state. Then, at this moment (t1), the sound source position of the sound marker Ms may be changed so as to get closer to the real object, as shown in FIG. 12. In addition, if the orientation of the user's face is further changed until the orientation is set to be the front side of the user, the sound source position of the sound marker Ms may be at the position of the real object.

Hereinabove, embodiments of the present disclosure have been described in detail with reference to accompanying drawings, but the technical scope of the present disclosure is not limited to the above-described embodiments. It should be understood by those skilled in the art that various modifications, combinations, sub-combinations and alterations may occur depending on design requirements and other factors insofar as they are within the scope of the appended claims or the equivalents thereof, and they are of course understood so as to belong to the technical scope of the present disclosure.

In the above-described embodiments, for example, the secondary information is configured to be presented when an operation for the primary information is detected, but the present technology is not limited to such. For example, detailed information may be presented from the beginning. Alternatively, information may be presented in a further number of stages.

Furthermore, in the present specification, the steps described in the flowcharts include not only processes performed in a time series manner along the described order but also processes executed in parallel or in an individual manner, although not necessarily performed in a time series. In addition, it is needless to say that even in steps processed in a time series manner, the order can be appropriately changed without changing an intended result.

Additionally, the present technology may also be configured as below.

(1) An information processing apparatus including:
a sound output control unit configured to generate localization information of a sound marker based on a virtual position: and
a sound output unit configured to output a sound associated with the sound marker, based on the localization information,
wherein the virtual position is determined based on a position of a real object present in a space.

(2) The information processing apparatus of (1), wherein the sound output unit is further configured to audibly output the sound concurrently with a displaying of a visual marker on a display unit at the virtual position.

(3) The information processing apparatus of (1), wherein the sound output control unit is further configured to determine a sound source position of the sound marker.

(4) The information processing apparatus of (3), wherein the sound output control unit is further configured to determine the sound source position of the sound marker based on the virtual position.

(5) The information processing apparatus of (3), wherein the sound output control unit is further configured to determine the sound source position of the sound marker based on a distance between a position of a user and the virtual position.

(6) The information processing apparatus of (5), wherein when the distance between the position of the user and the virtual position is greater than a threshold value, the sound output control unit is further configured to determine the sound source position of the sound marker to be at a location that is located closer to being directly in front of the user than to the virtual position.

(7) The information processing apparatus of (6), wherein when the distance between the position of the user and the virtual position is less than a threshold value and reducing, the sound output control unit is further configured to determine the sound source position of the sound marker as correspondingly moving from a front side of the user towards the real object.

(8) The information processing apparatus of (5), wherein when the distance between the position of the user and the virtual position is less than a threshold value, the sound output control unit is further configured to determine the sound source position of the sound marker to be located at a corresponding point along a circumference having a radius of the threshold value and centered on the position of the user.

(9) The information processing apparatus of (8), wherein as the real object passes from a front side of the user to a back side of the user, the sound output control unit is further configured to determine the sound source position of the sound marker as moving along the circumference from the front side of the user to the back side of the user until reaching a position located directly behind the user at which point the sound source position of the sound marker then recedes away from the user along a path of a vector.

(10) The information processing apparatus of (5), wherein:
when the distance between the position of the user and the virtual position is greater than a threshold value, the sound output control unit is further configured to determine the sound source position of the sound marker to be on a front side of the user, and
when the user approaches a physical location corresponding to the virtual position, the sound output control unit is further configured to determine the sound source position of the sound marker as moving from the front side of the user in a direction towards the virtual position.

(11) The information processing apparatus of (5), wherein:

as the distance between the position of the user and the virtual position decreases to approach a threshold value, the sound output control unit is further configured to determine the sound source position of the sound marker as moving closer to the position of the user along a vector that is parallel to a straight ahead direction of the user;

as the distance between the position of the user and the virtual position decreases from the threshold value to a point in time at which the virtual position is directly in front of the user, the sound output control unit is further configured to determine the sound source position of the sound marker a moving along a circumference having a radius of the threshold value and centered on the position of the user towards a position located directly in front of the user, and as the virtual position moves from being directly in front of the user towards a back side of the user, the sound output control unit is further configured to determine the sound source position of the sound marker as moving from the position located directly in front of the user and along the circumference towards the back side of the user and out of a visible region of the user.

(12) The information processing apparatus of (5), wherein the sound output control unit is further configured to change the sound source position of the sound marker according to a change in an orientation of a face of a user.

(13) The information processing apparatus of (3), wherein the sound output control unit is further configured to set the sound source position of the sound marker as a same location as the virtual position, when the virtual position is within a visible area in front of a user.

(14) The information processing apparatus of (3), wherein the sound output control unit is further configured to determine the sound source position of the sound marker such that a user perceives output sound as originating from a location of the real object.

(15) The information processing apparatus of (1), further including:

a display unit configured to display a visual marker at the virtual position in a superimposing manner over a video image.

(16) The information processing apparatus of (1), further including:

a head mounted display configured to display a visual marker at the virtual position.

(17) The information processing apparatus of (1), wherein when the real object is present within a visible region of a user, the virtual position is set to be located at the position of the real object.

(18) The information processing apparatus of (1), wherein the sound output control unit is further configured to generate the localization information by filtering information associated with real objects located in proximity to a user.

(19) The information processing apparatus of (1), wherein the sound has a directivity based on the localization information.

(20) The information processing apparatus of (1), wherein a movement of the real object is determined by detecting a change between a first point in time and a second point in time of a frequency of the sound as perceived by a user.

(21) The information processing apparatus of (1), wherein the sound marker is not visible to a user.

(22) An information processing method including:

generating localization information of a sound marker based on a virtual position; and outputting a sound associated with the sound marker, based on the localization information, wherein the virtual position is determined based on a position of a real object present in a space.

(23) The information processing method of (22), wherein the sound is audibly outputted by an audio producing unit concurrently with a displaying of a visual marker on a display unit at the virtual position.

(24) The information processing method of (22), further including:

displaying a visual marker at the virtual position; and selecting the visual marker as information that is desired by a user.

(25) The information processing method of (24), wherein the visual marker is selected based on a movement of a head of the user.

(26) The information processing method of (22), wherein the generating the localization information includes determining a sound source position of the sound marker.

(27) The information processing method of (26), wherein the sound source position of the sound marker is determined based on the virtual position.

(28) The information processing method of (26), wherein the sound source position of the sound marker is determined based on a distance between a position of a user and the virtual position.

(29) The information processing method of (28), wherein when the distance between the position of the user and the virtual position is greater than a threshold value, the sound source position of the sound marker is determined to be at a location that is located closer to being directly in front of the user than to the virtual position.

(30) The information processing method of (29), wherein when the distance between the position of the user and the virtual position is less than a threshold value and reducing, the sound source position of the sound marker correspondingly moves from a front side of the user towards the real object.

(31) The information processing method of (28), wherein when the distance between the position of the user and the virtual position is less than a threshold value, the sound source position of the sound marker is determined to be located at a corresponding point along a circumference having a radius of the threshold value and centered on the position of the user.

(32) The information processing method of (31), wherein as the real object passes from a front side of the user to a back side of the user, the sound source position of the sound marker moves along the circumference from the front side of the user to the back side of the user until reaching a position located directly behind the user at which point the sound source position of the sound marker then recedes away from the user along a path of a vector.

(33) The information processing method of (28), wherein:

when the distance between the position of the user and the virtual position is greater than a threshold value, the sound source position of the sound marker is determined to be on a front side of the user; and when the user approaches a physical location corresponding to the virtual position, the sound source position of the sound marker moves from the front side of the user in a direction towards the virtual position.

(34) The information processing method of (28), wherein:

as the distance between the position of the user and the virtual position decreases to approach a threshold value, the sound source position of the sound marker moves closer to the position of the user along a vector that is parallel to a straight ahead direction of the user;

as the distance between the position of the user and the virtual position decreases from the threshold value to a point in time at which the virtual position is directly in front of the user, the sound source position of the sound marker moves along a circumference having a radius of the threshold value and centered on the position of the user towards a position located directly in front of the user, and as the virtual position moves from being directly in front of the user towards a back side of the user, the sound source position of the sound marker moves from the position located directly in front of the user and along the circumference towards the back side of the user and out of a visible region of the user.

(35) The information processing method of (26), further including:

changing the sound source position of the sound marker according to a change in an orientation of a face of a user.

(36) The information processing method of (26), further including:

setting the sound source position of the sound marker as a same location as the virtual position, when the virtual position is within a visible area in front of a user.

(37) The information processing method of (26), wherein the sound source position of the sound marker is determined such that a user perceives output sound as originating from a location of the real object.

(38) The information processing method of (22), wherein a visual marker is displayed at the virtual position by a display unit in a superimposing manner over a video image.

(39) The information processing method of (22), wherein a visual marker is displayed at the virtual position by using a head mounted display that is worn by a user.

(40) The information processing method of (22), wherein when the real object is present within a visible region of a user, the virtual position is set to be located at the position of the real object.

(41) The information processing method of (22), wherein the generating the localization information includes filtering information associated with real objects located in proximity to a user.

(42) The information processing method of (22), wherein the sound has a directivity based on the localization information.

(43) The information processing method of (22), further including:

determining a movement of the real object by detecting a change between a first point in time and a second point in time of a frequency of the sound as perceived by a user.

(44) The information processing method of (22), wherein the sound marker is not visible to a user.

(45) A non-transitory computer-readable medium embodied with a program, which when executed by a computer, causes the computer to perform a method including:

generating localization information of a sound marker based on a virtual position; and outputting a sound associated with the sound marker, based on the localization information, wherein the virtual position is determined based on a position of a real object present in a space.

(46) The computer-readable medium of (45), further including:

displaying a visual marker at the virtual position; and selecting the visual marker as information that is desired by a user.

(47) The computer-readable medium of (46), wherein the visual marker is selected based on a movement of a head of the user.

(48) The computer-readable medium of (45), wherein the generating the localization information includes determining a sound source position of the sound marker.

(49) The computer-readable medium of (48), wherein the sound source position of the sound marker is determined based on a distance between a position of a user and the virtual position.

(50) The computer-readable medium of (49), wherein when the distance between the position of the user and the virtual position is greater than a threshold value, the sound source position of the sound marker is determined to be at a location that is located closer to being directly in front of the user than to the virtual position.

(51) The computer-readable medium of (50), wherein when the distance between the position of the user and the virtual position is less than a threshold value and reducing, the sound source position of the sound marker correspondingly moves from a front side of the user towards the real object.

(52) The computer-readable medium of (49), wherein when the distance between the position of the user and the virtual position is less than a threshold value, the sound source position of the sound marker is determined to be located at a corresponding point along a circumference having a radius of the threshold value and centered on the position of the user.

(53) The computer-readable medium of (50), wherein as the real object passes from a front side of the user to a back side of the user, the sound source position of the sound marker moves along the circumference from the front side of the user to the back side of the user until reaching a position located directly behind the user at which point the sound source position of the sound marker then recedes away from the user along a path of a vector.

(54) The computer-readable medium of (49), wherein:

when the distance between the position of the user and the virtual position is greater than a threshold value, the sound source position of the sound marker is determined to be on a front side of the user; and when the user approaches a physical location corresponding to the virtual position, the sound source position of the sound marker moves from the front side of the user in a direction towards the virtual position.

(55) The computer-readable medium of (49), wherein:

as the distance between the position of the user and the virtual position decreases to approach a threshold value, the sound source position of the sound marker moves closer to the position of the user along a vector that is parallel to a straight ahead direction of the user;

as the distance between the position of the user and the virtual position decreases from the threshold value to a point in time at which the virtual position is directly in front of the user, the sound source position of the sound marker moves along a circumference having a radius of the threshold value and centered on the position of the user towards a position located directly in front of the user, and as the virtual position moves from being directly in front of the user towards a back side of the user, the sound source position of the sound marker moves from the position

17 located directly in front of the user and along the circumference towards the back side of the user and out of a visible region of the user.

(56) The computer-readable medium of (48), further including:

changing the sound source position of the sound marker according to a change in an orientation of a face of a user.

(57) An information processing device including:

an acquisition unit that acquires a virtual position of a virtual object determined based on a position of a real object present in a space; and a localization information generation unit that generates localization information indicating a sound source position of sound information associated with the virtual object based on the virtual position.

(58) The information processing device according to (57), wherein the localization information generation unit generates the localization information based on the distance between a user position and the virtual position.

(59) The information processing device according to (58), wherein, when the distance between the user position and the virtual position is equal to or longer than a predetermined threshold value, the localization information generation unit causes the sound source position to get closer to the front side of the user than to the virtual position.

(60) The information processing device according to (59), wherein, when the distance between the user position and the virtual position is shorter than the threshold value, the localization information generation unit causes the sound source position to move from the front side of the user to the direction of the real object.

(61) The information processing device according to (60), wherein, when the distance between the user position and the virtual position is shorter than the threshold value, the localization information generation unit causes the sound source position to move along a circumference having the threshold value as a radius and having the user position as a center.

(62) The information processing device according to any one of (57) to (61), wherein, when the virtual position is located in a predetermined region in the front direction of the user, the localization information generation unit sets the virtual position at the sound source position.

(63) The information processing device according to any one of (57) to (62), further including:

an orientation detection unit that detects an orientation of a user's face.

wherein the localization information generation unit generates the localization information based on the orientation of the face.

(64) The information processing device according to any one of (57) to (63), further including:

a display control unit that causes the virtual object to be displayed at the virtual position.

(65) The information processing device according to (64), further including:

a sound output control unit that causes the sound information to be output based on the localization information when a selection operation of selecting the displayed virtual object is detected.

(66) The information processing device according to (64) or (65), wherein the display control unit causes primary information of the virtual object to be displayed at the virtual position, and causes secondary information of the virtual object to be displayed when a selection operation of selecting the virtual object is detected.

18

(67) The information processing device according to (65) or (66), wherein the selection operation is detected based on an orientation of a user's face.

(68) An information processing method including:

acquiring a virtual position of a virtual object determined based on a position of a real object present in a space; and generating localization information indicating a sound source position of sound information associated with the virtual object based on the virtual position.

(69) A program that causes a computer to function as an information processing device including:

an acquisition unit that acquires a virtual position of a virtual object determined based on a position of a real object present in a space; and a localization information generation unit that generates localization information indicating a sound source position of sound information associated with the virtual object based on the virtual position.

The invention claimed is:

1. An information processing apparatus comprising:
circuitry configured to
initiate display, at an edge of a display region of a display device, of a first visual marker to be superimposed on a real-world view or captured image of the real world, the edge of the display region of the display device corresponding to a boundary of a visual field of a user currently viewing the real-world view or captured image of the real world, and the first visual marker containing primary information of information associated with a position outside a visual field of the user,
initiate display, at the edge of the display region of the display device, of a second visual marker to be superimposed on the same real-world view or captured image of the real world, the second visual marker containing secondary information of the information associated with the position outside the visual field of the user, based on detection of a selection operation for the displayed primary information, and
initiate an outputting of a sound associated with a sound marker as emanating from a sound source position based on a position of the displayed second visual marker in relation to a position of the user,
wherein the secondary information includes further detailed information not included in the primary information,
wherein the first visual marker and the second visual marker are each displayed at respective locations of the display region to indicate a direction, relative to the user, at which the position outside the visual field of the user is located in the real world, and
wherein when the selection operation is detected, the second visual marker is presented to replace the first visual marker for display at the edge of the display region and the first visual marker is removed from being displayed.

2. The information processing apparatus of claim 1, wherein the sound is audibly outputted concurrently with a displaying of the second visual marker at the edge of the display region.

3. The information processing apparatus of claim 1, wherein the sound source position of the sound marker is determined based on a positional relationship between the displayed second visual marker and the position of the user.

4. The information processing apparatus of claim 3, wherein the sound source position of the sound marker is based on a virtual position determined based on a position of a real object present in a space.

5. The information processing apparatus of claim 4, wherein the sound source position of the sound marker is based on a distance between the position of a user and the virtual position.

6. The information processing apparatus of claim 5, wherein when the distance between the position of the user and the virtual position is greater than a threshold value, the sound source position of the sound marker is determined to be at a location that is located closer to being directly in front of the user than to the virtual position.

7. The information processing apparatus of claim 6, wherein when the distance between the position of the user and the virtual position is less than a threshold value and reducing, the sound source position of the sound marker is determined to be correspondingly moving from a front side of the user towards the real object.

8. The information processing apparatus of claim 5, wherein when the distance between the position of the user and the virtual position is less than a threshold value, the sound source position of the sound marker is determined to be located at a corresponding point along a circumference having a radius of the threshold value and centered on the position of the user.

9. The information processing apparatus of claim 8, wherein as the real object passes from a front side of the user to a back side of the user, the sound source position of the sound marker is determined to be moving along the circumference from the front side of the user to the back side of the user until reaching a position located directly behind the user at which point the sound source position of the sound marker then recedes away from the user along a path of a vector.

10. The information processing apparatus of claim 5, wherein:
when the distance between the position of the user and the virtual position is greater than a threshold value, the sound source position of the sound marker is determined to be on a front side of the user; and
when the user approaches a physical location corresponding to the virtual position, the sound source position of the sound marker is determined to be moving from the front side of the user in a direction towards the virtual position.

11. The information processing apparatus of claim 5, wherein:
as the distance between the position of the user and the virtual position decreases to approach a threshold value, the sound source position of the sound marker is determined to be moving closer to the position of the user along a vector that is parallel to a straight ahead direction of the user;
as the distance between the position of the user and the virtual position decreases from the threshold value to a point in time at which the virtual position is directly in front of the user, the sound source position of the sound marker is determined to be moving along a circumference having a radius of the threshold value and centered on the position of the user towards a position located directly in front of the user; and
as the virtual position moves from being directly in front of the user towards a back side of the user, the sound source position of the sound marker is determined to be moving from the position located directly in front of the user and along the circumference towards the back side of the user and out of a visible region of the user.

12. The information processing apparatus of claim 5, wherein the circuitry is further configured to change the sound source position of the sound marker according to a change in an orientation of a face of a user.

13. The information processing apparatus of claim 4, wherein the circuitry is further configured to set the sound source position of the sound marker as a same location as the virtual position, when the virtual position is within a visible area in front of the user.

14. The information processing apparatus of claim 4, wherein the circuitry is further configured to determine the sound source position of the sound marker such that the user perceives output sound as originating from a location of the real object.

15. The information processing apparatus of claim 4, wherein when the real object is present within a visible region of the user, the virtual position is set to be located at the position of the real object.

16. The information processing apparatus of claim 4, wherein a movement of the real object is determined by detecting a change between a first point in time and a second point in time of a frequency of the sound as perceived by the user.

17. The information processing apparatus of claim 1, wherein the first visual marker and the second visual marker are displayed in a superimposing manner over a video image.

18. The information processing apparatus of claim 1, further comprising:
a head mounted display configured to display the first visual maker and the second visual marker.

19. The information processing apparatus of claim 1, wherein the sound is generated based on information associated with real objects located in proximity to the user.

20. The information processing apparatus of claim 1, wherein the sound has directivity.

21. The information processing apparatus of claim 1, wherein the sound marker is not visible to the user.

22. An information processing method comprising:
displaying, at an edge of a display region of a display device, a first visual marker to be superimposed on a real-world view or captured image of the real world, the edge of the display region of the display device corresponding to a boundary of a visual field of a user currently viewing the real-world view or captured image of the real world, and the first visual marker containing primary information of information associated with a position outside a visual field of the user;
displaying, at the edge of the display region, a second visual marker to be superimposed on the same real-world view or captured image of the real world, the second visual marker containing secondary information of the information associated with the position outside the visual field of the user, based on detection of a selection operation for the displayed primary information; and
outputting a sound associated with a sound marker as emanating from a sound source position based on a position of the displayed second visual marker in relation to a position of the user,
wherein the secondary information includes further detailed information not included in the primary information,
wherein the first visual marker and the second visual marker are each displayed at respective locations of the display region to indicate a direction, relative to the user, at which the position outside the visual field of the user is located in the real world, and wherein when the selection operation is detected, the second visual marker is presented to replace the first visual marker for display at the edge of the display region and the first visual marker is removed from being displayed.

23. A non-transitory computer-readable medium embodied with a program, which when executed by a computer, causes the computer to perform a method comprising:

displaying, at an edge of a display region of a display device, a first visual marker to be superimposed on a real-world view or captured image of the real world, the edge of the display region of the display device corresponding to a boundary of a visual field of a user currently viewing the real-world view or captured image of the real world, and the first visual marker containing primary information of information associated with a position outside a visual field of the user;

displaying, at the edge of the display region, a second visual marker to be superimposed on the same real-world view or captured image of the real world, the second visual marker containing secondary information of the information associated with the position outside the visual field of the user, based on detection of a selection operation for the displayed primary information; and outputting a sound associated with a sound marker as emanating from a sound source position based on a position of the displayed second visual marker in relation to a position of the user, wherein the secondary information includes further detailed information not included in the primary information, wherein the first visual marker and the second visual marker are each displayed at respective locations of the display region to indicate a direction, relative to the user, at which the position outside the visual field of the user is located in the real world, and wherein when the selection operation is detected, the second visual marker is presented to replace the first visual marker for display at the edge of the display region and the first visual marker is removed from being displayed.

* * * * *